United States Patent
Chauvette

[19]
[11] Patent Number: 5,934,657
[45] Date of Patent: Aug. 10, 1999

[54] SETUP DEVICE FOR MACHINE TOOLS

[76] Inventor: Marc J. Chauvette, 720 E. Industrial Park Dr., Unit 12, Manchester, N.H. 03109-5626

[21] Appl. No.: 08/715,976

[22] Filed: Sep. 19, 1996

[51] Int. Cl.[6] .................................................. B25B 5/04
[52] U.S. Cl. .............................. 269/99; 269/231; 269/235
[58] Field of Search .................................. 269/91–94, 99, 269/100, 229, 231, 235

[56] References Cited

U.S. PATENT DOCUMENTS

| | | | |
|---|---|---|---|
| 1,259,760 | 3/1918 | Kaiser | 269/231 |
| 3,827,685 | 8/1974 | Wennes | 269/231 |
| 4,589,640 | 5/1986 | Pert | 269/236 |
| 5,608,970 | 3/1997 | Owen | 269/99 |
| 5,695,178 | 12/1997 | Lenzkes | 269/93 |

*Primary Examiner*—Robert C. Watson
*Attorney, Agent, or Firm*—Davis and Bujold

[57] ABSTRACT

A setup device for use in a machine way channel of a machine table comprising an elongate member having opposed first and second ends. The elongate member has a stock engaging surface located adjacent the first end for facilitating alignment of a desired piece of stock relative to the machine way channel. The second end of the setup device supports a locking arrangement for releasably engaging with the machine way channel of a machine table. The setup device also includes a mechanism for facilitating rotation of the setup device for locking and unlocking the setup device, as desired, from the channel.

18 Claims, 2 Drawing Sheets

SETUP DEVICE FOR MACHINE TOOLS

FIELD OF THE INVENTION

This invention relates to setup devices and more particularly to setup devices having an asymmetrical surface for engagement with a machine way of a machine table to be releasably locked therewith and provide a reference point during machining of an object.

BACKGROUND OF THE INVENTION

Setup devices for machine tables are used to assist with shaping, milling, cutting, drilling, grinding, polishing, etc. of stock and are well known in the art. Setup devices are typically used as jigs to provide guidance and/or support for raw stock which is to be processed in some manner by a machine tool(s). Conventional setup devices typically comprise a member having one end formed in a T-shaped configuration. The T-shaped end of the setup device is inserted into a machine way channel, which generally has an inverted T-shaped transverse cross section. The setup device is inserted such that the portion of the setup device forming the T-shaped end mates with the machine way channel. Thereafter, an appropriate device, e.g. a clamp, engages with the T-shaped body.

One drawback associated with such known setup devices is that they are not quickly or easily inserted into and removed from the machine way channels since the T-shaped end portion of the setup device must be inserted and removed via an end of the machine way channel. In addition, the conventional setup devices sometimes may not be capable of being removed while the machine tool is in use, since the stock secured to the machine table may interfere with the removal of the T-shaped end portion of the setup device from the machine way channel. Lastly, the known setup devices do not easily facilitate accurate and reliable alignment for a stock to be machined relative to the machine table of a machining device.

Another major drawback associated with prior art setup devices is the difficulty in aligning a longitudinal axis or edge of a piece of stock to be machined parallel to a longitudinal axis of a channel. Currently, there are not any quick and easy ways of ensuring that the longitudinal edge of a piece of stock is accurately aligned, within one or two thousandths of an inch or so, parallel to the longitudinal axis of the channel.

SUMMARY OF THE INVENTION

Wherefore, it is an object of the present invention to overcome the aforementioned problems and drawbacks associated with prior art designs.

A further object of the invention is to provide a setup device which is quick and easy to install in and remove from a machine way of a machine table.

Yet another object of the invention is to provide a setup device which assists with proper alignment of the stock relative to the machine table while allowing the setup device to be readily removed from a machine way while the stock remains secured to a machine table.

Still another object of the invention is to provide a setup device which is relatively easy and inexpensive to manufacture and easy to operate by a machinist.

Another object of the invention is to provide a device which enables a machinist to quickly, easily and properly align a piece of stock with a longitudinal axis of a channel, i.e. within one or two thousandths of an inch, so that precise machining of the stock can be facilitated and valuable setup time can be saved.

The present invention relates to a setup device for use on a machine table to align stock, said setup device comprising: an elongate member having opposed first and second ends and defining a central longitudinal axis; a stock engaging surface being located remote from said second end for engaging with and facilitating alignment of a desired piece of stock; a locking surface being located adjacent said second end of said setup device for engaging with a channel of a machine table and releasably securing said setup device to said channel; and a mechanism for facilitating rotation of said elongate member, when engaged with said channel of said machine table, to secure said setup device at a desired location with respect to said channel and thereby facilitate alignment of a desired piece of stock, relative to the machine table, via said stock engaging surface.

The present invention also relates to a machine table in combination with at least two setup devices for use in aligning stock relative to said machine table, said machine table comprising a planar surface having at least one longitudinal channel formed therein and extending parallel to said planar surface; and each of said at least two setup devices comprising: an elongate member having opposed first and second ends and each defining a central longitudinal axis; a stock engaging surface being located remote from said second end for engaging with and facilitating alignment of a desired piece of stock; a locking surface being located adjacent said second end of each said setup device for engaging with a channel of a machine table and releasably securing said setup device to said channel; and a mechanism for facilitating rotation of each said elongate member, when engaged with said channel of said machine table, to secure each said setup device at a desired location with respect to said channel and thereby facilitate alignment of a desired piece of stock, relative to the machine table, via said stock engaging surface.

Finally, the present invention relates to a method of using a setup device on a machine table to align stock relative to said machine table, said machine table comprising a planar surface having at least one longitudinal channel formed therein and extending parallel to said planar surface; and each of said at least two setup devices comprising an elongate member having opposed first and second ends and defining a central longitudinal axis; a stock engaging surface being located remote from said second end for engaging with and facilitating alignment of a desired piece of stock; a locking surface being located adjacent said second end of each said setup device for engaging with a channel of a machine table and releasably securing said setup device to said channel; and a mechanism for facilitating rotation of each said elongate member, when engaged with said channel of said machine table, to secure each said setup device at a desired location with respect to said channel and thereby facilitate alignment of a desired piece of stock, relative to the machine table, via said stock engaging surface; said method comprising the steps of inserting said second end of each of said at least two setup devices into a channel of said machine table at desired locations along said channel; rotating each said setup device, via said mechanism for facilitating rotation, to secure said setup devices to said channel in a spaced relationship at desired locations; abutting a desired piece of stock against said stock engaging surfaced of each of said at least two setup devices to align said stock relative to the machine table; and clamping said desired piece of stock to said machine table via a clamping device.

The above and other objects of the present invention will be further understood with reference to the following description and appended drawings.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
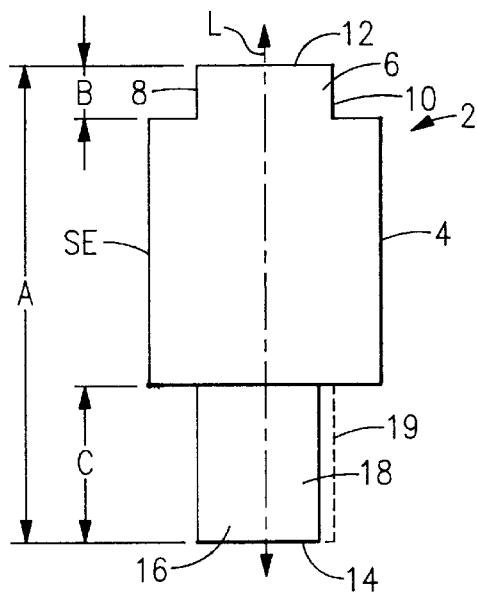
FIG. 1 is a diagrammatic front elevational view of a setup device according to the present invention.

Turning now to FIG. 1, a detailed description concerning the present invention will now be provided. A setup device, generally designated by the reference numeral 2, comprises an elongate member which has an axial length A and defines a central longitudinal axis L. Setup device 2 comprises a central portion 4 which is preferably cylindrical in shape and having a diameter D. It is to be appreciated that the central portion 4 may have any desired shape which provides a stock engaging surface SE to support and/or guide items or objects, such as raw stock, which are to be processed by a machining tool.

Figure 2:
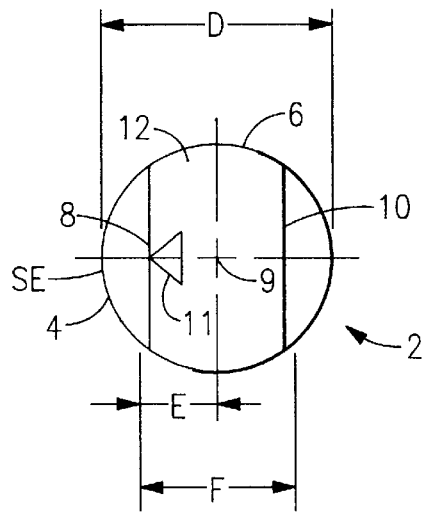
FIG. 2 is a diagrammatic top plan view of FIG. 1.

A mechanism 6 for rotating the setup device is formed on a first end of central portion 4. Mechanism 6 is generally a cylindrical extension protruding axially from central portion 4 along central longitudinal axis L. Two planar surfaces 8, 10, spaced apart from and extending parallel to one another and to central longitudinal axis L, can be seen in FIG. 2 and comprise rotatable mechanism 6. Surfaces 8 and 10 also extend perpendicular to a first end surface 12 of setup device 2. Surfaces 8 and 10 are spaced apart a desired distance so as to be easily engaged by a wrench (not shown) which is used to rotate setup device 2 for securing and releasing the setup device 2 from a machine way of a machine table, as will be explained in further detail below. Rotatable mechanism 6 has depth B and diameter D. The spacing between surfaces 8 and 10 is distance F, while each surface 8 and 10 is spaced a distance E from a point 9 coincident with central longitudinal axis L. It is to be appreciated that a variety of other known devices or mechanisms, for facilitating rotation of the setup member when located in a machine way channel of the machine table, can be used in place of rotatable mechanism 6 shown in FIGS. 1–3 of the drawings.

Marking indicia 11 is provided on end surface 12 of rotatable mechanism 6 in order to indicate to a user the proper orientation of setup device 2, i.e. the proper surface area of central portion 4 to be used to align stock. Further details concerning the desired orientation of setup device 2 are provided below.

Figure 3:
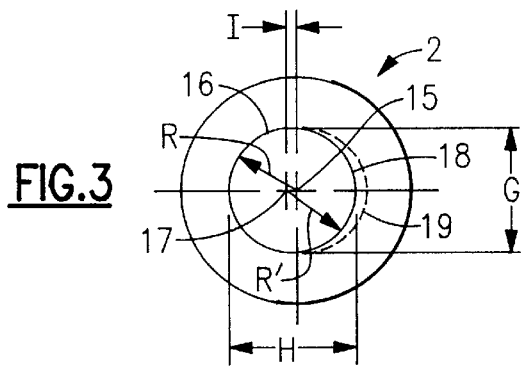
FIG. 3 is a diagrammatic bottom plan view of FIG. 1.

Locking member 14 is formed on a second end of the elongate member. Locking member 14 is a generally egg or oval shaped extension protruding from central portion 4 and substantially coaxial with central longitudinal axis L. As can be seen in FIG. 3, a first half or arcuate portion 16 of locking member 14 comprises an arc having a radius of curvature R with its center point 15 located on central longitudinal axis L. A second arcuate portion 18 of locking member 14 is an arc having a radius of curvature R' with its center point 17 offset a distance I from center point 15 toward first arcuate portion 16.

The largest transverse dimension of locking member 14 is designated as G and is equal to the diameter of first arcuate portion 16. In this embodiment, first arcuate portion 16 is a semicircle and transverse dimension G is measured from one end of the semicircle, through the center point to the other end of the semicircle. The smallest transverse dimension of locking member 14 extends perpendicular to dimension G and is designated as H. Distance H is the sum of radius R plus radius R' minus distance I. As can be seen in the drawings, second arcuate portion 18 is completely accommodated within an arc 19 (shown in dotted lines), which is a continuation of the arc having a radius R, with center point 15, formed into a complete circle. In this embodiment, the center point of the second arcuate portion 18 is located within the semicircle of the first arcuate portion 16.

Figure 4:
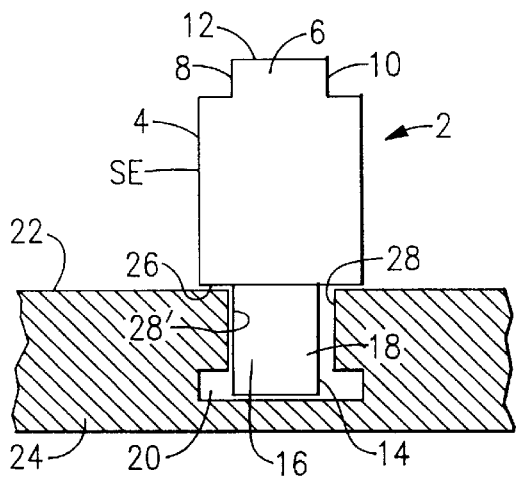
FIG. 4 is a diagrammatic partial cross-sectional view of the setup device of the present invention inserted into a machine way of a machine table.

Turning now to FIG. 4, a stop surface 26 is formed between and separates the stock engaging surface SE of the central portion 4 from the locking member 14. The stop surface 26 defines a plane which extends normal to central longitudinal axis L of the elongate member.

An explanation concerning the use of setup device 2 will now be provided. Locking member 14 is first inserted into a T-shaped machine way channel 20 of a machine table 24, having a width less than cross dimension G but greater than cross dimension H. The depth of the channel 20 is preferably greater than the axial length of the locking member 14, which has dimension C, so that stop surface 26 abuts against top surface 22 to the machine table 24 and prevents further insertion therein of the setup device 2. Stop surface 26 operates to maintain central longitudinal axis L parallel to inwardly facing surfaces 28, 28' of channel 20, when setup device 2 is located within channel 20. Locking member 14 is inserted in a manner such that cross dimension H of locking member 14 is located substantially perpendicular to the longitudinal length of channel 20. With the setup device 2 in this position, the setup device is easily inserted until stop surface 26 abuts against top surface 22 and then the setup device is rotated, via a wrench (not shown) engaging opposed surfaces 8, 10, in either a clockwise or a counter-clockwise direction in order to secure setup device 2 to channel 20. The amount of rotation that is generally necessary is about 5 to about 85 degrees, more preferably about 15 to about 75 degrees and most preferably about 20 to about 25 degrees.

Figure 5:
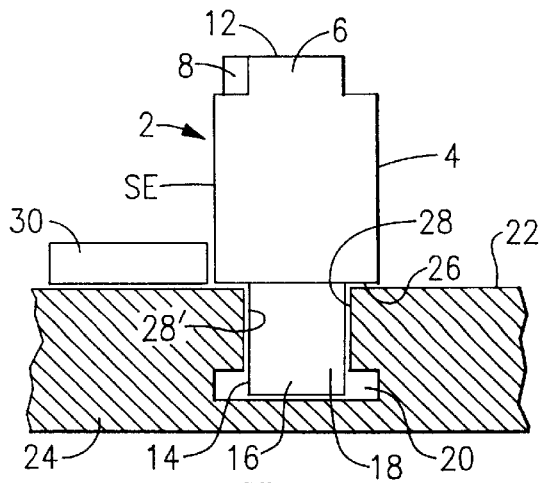
FIG. 5 is a diagrammatic partial cross-sectional view of the setup device of the present invention engaged with a machine way of a machine table, with a piece of stock abutting against the setup device.

Turning now to FIG. 5, setup device 2 is shown in a locked state where first and second portions 16, 18 of locking member 14 are each respectively engaged with one opposed inwardly facing surface 28', 28 of channel 20 (e.g. setup device was rotated in a counterclockwise direction in this example). A second setup device 2, which cannot be seen in this figure, is also locked in position in the same channel 20 behind the setup device shown in FIG. 5. Once this has occurred, stock 30 can then be placed on top surface 22 of machine table 24 and abutted against stock engaging surfaces SE of the pair of setup devices 2 thereby ensuring that stock 30 is maintained in a desired machining position, i.e. the stock 30 is aligned parallel to channel 20. After the stock 30 is so aligned, it is adequately clamped to the table by clamps (not shown) and the machining device can then be programmed or manually operated so that complete accuracy of the machining operation is thereby ensured. It is to be appreciated that two or more setup devices 2 may be inserted into channel 20 or into any adjacent channel(s) 20 in order to provide adequate support and/or guidance for stock 30 at a variety of different locations. Generally, between 2 to 8 setup devices 2 may be employed during any typical machining application.

Stock 30, once properly located in an abutting relationship with the associated setup device(s) 2, can then be secured in place by strapping members, clamping members or other conventional securing devices 33 (FIG. 7) or techniques which are well known in the trade. Thereafter, any desired one of the setup devices 2 can easily be removed by rotating the same in an opposite unlocking direction (e.g. clockwise in this example) and then withdrawing the setup device 2 from channel 20. Such setup device removal generally allows improved access to stock 30 located on machine table 24 over prior art devices. The removed setup device(s) 2 can then be used to align additional stock 30 on machine table 24 or used on another machine table or support surface.

An important aspect of the present invention is that the stock engaging surfaces SE of each setup device, located in any particular channel, must each have substantially identical dimensions. This ensures that the stock engaging surfaces of each employed setup device will be spaced an equal distance away from the central longitudinal axis of the setup device so that once the stock abuts two or more setup devices, such stock will also be spaced an equal distance from the longitudinal central axes of the two setup devices as well as a longitudinal axis LC of the channel accommodating the setup devices. In order to achieve this, the stock engaging surfaces SE must extend parallel to longitudinal central axes L of the setup device. It is preferred that the stock engaging surface SE be a curved surface to accommodate variations in channel width and as well as variations in the amount of rotation required to lock the setup device while still continually spacing the stock a desired distance from the longitudinal central axis L of the setup device.

Figure 6:
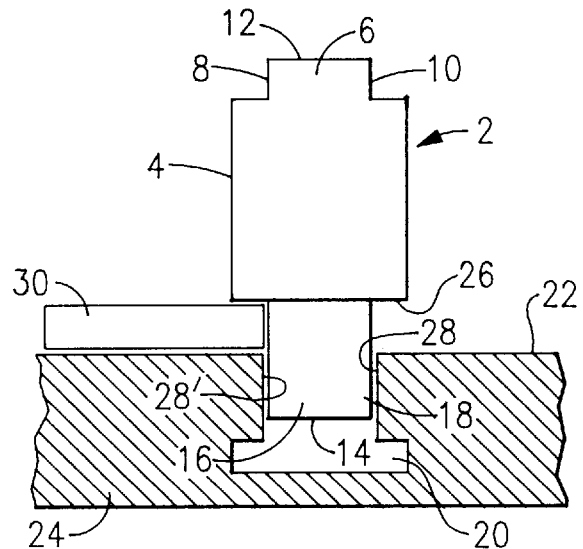
FIG. 6 is a diagrammatic partial cross-sectional view of the setup device, according to the present invention, engaged with a machine way of a machine table and clamping a piece of stock to the machine table.

With reference to FIG. 6, it can be seen that setup device 2 could also be used to both guide and anchor a relatively thin piece of stock 30 directly to top surface 22 of machine table 24 provided that stock 30 has substantially parallel top and bottom surfaces. Stock 30 is placed on top surface 22 of machine table 24 and locking member 14 of setup device 2 is located in channel 20 such that stop surface 26 of central portion 4 abuts against a top surface of stock 30. Setup device 2 is then rotated by a wrench (not shown) such that second arcuate portion 18 engages a first inwardly facing surface 28 of channel 20 while the first arcuate portion 16 engages a second inwardly facing surface 28' of channel 20, thereby securing stock 30 to the machine table 24 as well as providing a surface for aligning the stock relative to the longitudinal axis LC of channel 20 accommodating the setup device. According to this embodiment, the first arcuate portion 16 of the locking member 14 also functions as the-stock engaging surface.

Figure 7:
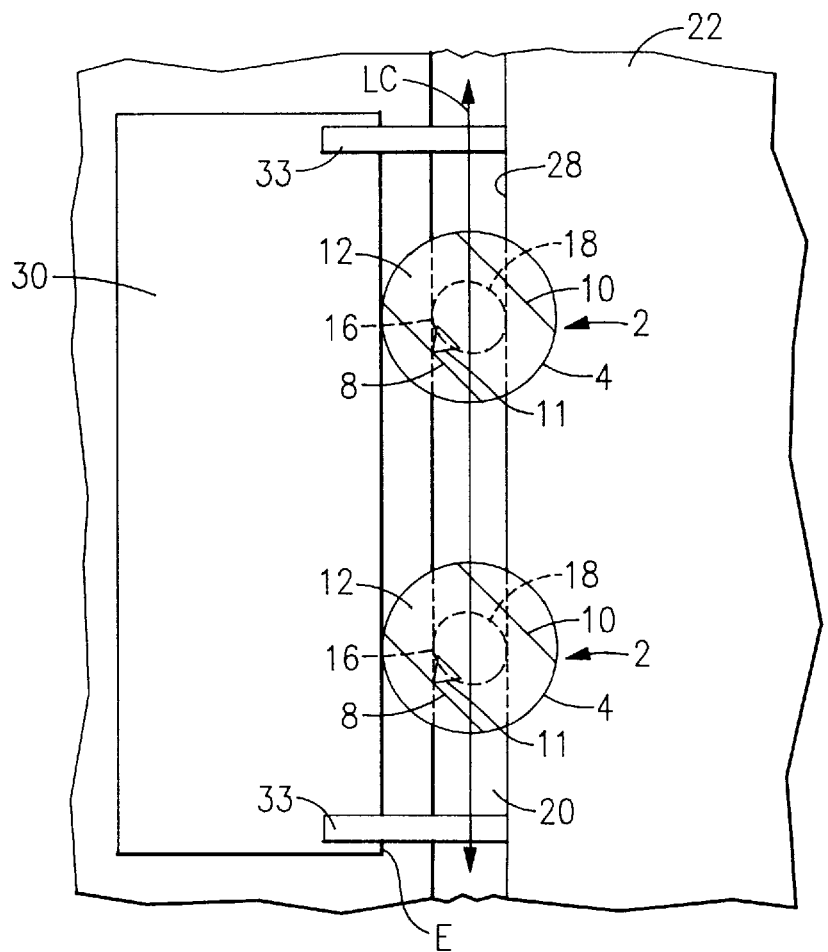
FIG. 7 is a diagrammatic top plan view of a pair of setup devices, according to of the present invention, engaged with a machine way of a machine table, with a piece of stock abutting against the pair of setup devices.

With reference to FIG. 7, it can be seen that stock 30 abuts a pair of setup devices 2. By this arrangement, longitudinal edge E of stock 30 is aligned and extends parallel to the longitudinal axis LC of channel 20. By inserting multiple setup devices 2 into channel 20 such that each first arcuate portion 16 maintains contact with one inwardly facing surface 28', during insertion as well as after setup devices 2 are rotated and locked in place, each outwardly facing stock engaging surface SE of central portion 4 is spaced an equal distance from the longitudinal axis LC of channel 20 and still remains parallel to channel 20 even after being secured in place.

Marking indicia 11 enables a user to consistently insert setup devices 2 in channel 20 in a desired orientation. Appropriate marking indicia 11 can be, for example, an arrow, numbers, letters, symbols, or any other traditional marking indicia which facilitates orientation of the setup device in a particular direction. By inserting setup devices 2 with marking indicia 11 oriented in a desired direction, an individual can be assured that first arcuate portion 16 contacts inwardly facing surface 28' and the stock 30 will abut the desired outwardly facing surface area of central portion 4.

The setup devices to be used on any single machine table should all have the same dimensions and configuration so that when the setup devices are used in combination with one another, they ensure that the stock is properly aligned parallel to the longitudinal axis of the channel. In a preferred embodiment, the setup devices are sold in pairs which have identical dimensions.

In a preferred embodiment, setup device 2 is formed such that central portion 4, rotatable mechanism 6 and locking member 14 are all formed from a single monolithic piece of material. For example, setup device 2 may be formed of hardened tool steel, or any other material which is resistant to wearing, in order to prevent deterioration of the camming or locking surfaces 16, 18, and 26 of setup device 2.

The following table sets forth preferred dimensions of setup device 2.

| Dimension | Value (inches) | Tolerance (+/− inches) |
|---|---|---|
| A | 2.250 | .005 |
| B | .250 | .010 |
| C | .750 | .005 |
| D | .990 | .001 |
| E | .340 | .005 |
| F | .680 | .010 |
| G | .640 | .001 |
| H | .600 | .002 |
| I | .042 | .002 |
| R | .320 | .0005 |
| R' | .322 | .002 |

An important aspect of the present invention is that the setup device provides a camming or locking surface for releasably engaging and locking with channel 20 of a machine table 24 and, at the same time, provides a surface for abutting against stock 30 to be supported by the machine table 24. During use, the setup devices space the stock a desired distance away from but parallel to the channel. It is to be noted that the overall shape of the setup device is not critical as long as the setup device provides both a camming or locking surface and a surface for aligning the stock parallel to the channel.

It is to be appreciated that the setup device 2 is designed so that a first arcuate portion 16 is received within the T-slot of a machine table which typically has a dimension of approximately 0.625 inches and may range from 0.624 inches to 0.628 inches, depending upon the tolerances of the machine table. Secondly, the center of dimension D must be substantially concentric with the center of dimension G, i.e. their TIR (total initial runout) can only vary by 0.0005 inches. This insures that the outer surfaces of those two concentric members are properly aligned with one another.

Since certain changes may be made in the above described setup device, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I claim:

1. A setup device for use on a machine table to align stock, said setup device comprising:
    an elongate member having opposed first and second ends and defining a central longitudinal axis;
    a stock engaging surface being located remote from said second end for engaging with and facilitating alignment of a desired piece of stock, and the stock engaging surface being concentric with the central longitudinal axis to facilitate spacing a desired piece of stock a desired distance away from the longitudinal axis regardless of the rotational orientation of the setup device;
    a locking member being located adjacent said second end of said setup device for engaging with a channel of a machine table and releasably securing said setup device to said channel, and said locking member having a generally elliptical transverse cross-section which only allows between about 5 degrees and about 80 degrees of rotation of the locking member within said channel of said machine table; and
    a mechanism for facilitating rotation of said elongate member, when engaged with said channel of said machine table, to secure said setup device at a desired location with respect to said channel and thereby facilitate alignment of a desired piece of stock, relative to the machine table, via said stock engaging surface.

2. The setup device according to claim 1, wherein said elongate member further includes a stop surface which extends perpendicular to said central longitudinal axis for engaging with a top surface of the machine table and maintaining said central longitudinal axis of said elongate member perpendicular to a plane defined by the machine table.

3. The setup device according to claim 1, wherein said generally elliptical transverse cross-section of said locking member has a first transverse dimension and a second transverse dimension extending perpendicular to said first transverse dimension, said first transverse dimension is greater than said second transverse dimension, and said first transverse dimension is greater than a width of said channel of said machine table so that said first transverse dimension only allows partial rotation of said locking member within said channel of said machine table.

4. The setup device according to claim 1, wherein at least a portion of said stock engaging surface is a curved surface which is spaced a constant distance from and extends parallel to said central longitudinal axis.

5. The setup device according to claim 1, wherein said generally elliptical transverse cross-section of said locking member only allows between about 15 degrees and about 75 degrees of rotation of said locking member within said channel of said machine table.

6. The setup device according to claim 1, wherein indicia is provided adjacent said first end of said setup device to indicate a desired area of said stock engaging surface to be used to align stock and thereby assist with proper usage of said setup device.

7. The setup device according to claim 2, wherein said stop surface is located between said locking member and said stock engaging surface and limits, during use, insertion of said locking member into said channel of said machine locking member has a first transverse dimension and a second transverse dimension extending perpendicular to said first transverse dimension, said first transverse dimension is greater than said second transverse dimension, and said first transverse dimension is greater than a width of said channel of said machine table so that said first transverse dimension only allows partial rotation of said locking member within said channel of said machine table.

8. The setup device according to claim 1, wherein said generally elliptical cross-section of said locking member is generally cylindrical in shape and comprises a first arcuate portion with a center point located coincident with said central longitudinal axis and a second arcuate portion with a center point offset from said central longitudinal axis in a direction toward said first arcuate portion.

9. The setup device according to claim 1, wherein said mechanism for facilitating rotation of said elongate member comprises a pair of spaced apart planar surfaces, a stop surface is located between said central portion and said locking member, and said stop surface is substantially planar and extends perpendicular to said central longitudinal axis.

10. A machine table in combination with at least two setup devices for use in aligning stock relative to said machine table, said machine table comprising a planar surface having at least one longitudinal channel formed therein which extends parallel to said planar surface; and each of said at least two setup devices comprising:
    an elongate member having opposed first and second ends and defining a central longitudinal axis of the elongate member;
    a stock engaging surface being located remote from said second end for engaging with and facilitating alignment of a desired piece of stock, and the stock engaging surface being concentric with the central longitudinal axis to facilitate spacing a desired piece of stock a desired distance away from the longitudinal axis regardless of the rotational orientation of the setup device;
    a locking member being located adjacent said second end of each said setup device for engaging with said channel of said machine table and releasably securing each said setup device to said channel of said machine table, and said locking member having a first transverse dimension and a second transverse dimension extending perpendicular to said first transverse dimension, said first transverse dimension is greater than said second transverse dimension, and said first transverse dimension is greater than a width of said channel of said machine table so that said first transverse dimension only allows partial rotation of said locking member within said channel of said machine table; and
    a mechanism for facilitating rotation of each said elongate member, when engaged with said channel of said machine table, to secure each said setup device at a desired location with respect to said channel and thereby facilitate alignment of a desired piece of stock, relative to the machine table, via said stock engaging surface.

11. The combination according to claim 10, wherein said elongate member further includes a stop surface which extends perpendicular to said central longitudinal axis for engaging with a machine table and maintaining said central longitudinal axis of said elongate member perpendicular to a plane defined by the machine table.

12. The combination according to claim 10, wherein said partial rotation of said locking member is between about 5 degrees and about 80 degrees of rotation of said locking member within said channel of said machine table.

13. The combination according to claim 10, wherein at least a portion of said stock engaging surface is a curved surface which is spaced a constant distance from said central longitudinal axis and extends parallel to said central longitudinal axis.

14. The combination according to claim 10, wherein said locking member has an asymmetrical transverse cross section which only allows between about 15 degrees and about 75 degrees of rotation of said locking member within said channel of said machine table.

15. The combination according to claim 10, wherein indicia is provided adjacent said first end of said setup device to indicate a desired area of said stock engaging surface to be used to align stock and thereby assist with proper usage of said setup device.

16. The combination according to claim 11, wherein said stop surface is located between said locking member and said stock engaging surface and limits, during use, insertion of said locking member into said channel of said machine table.

17. The combination according to claim 10, wherein said locking member is generally cylindrical in shape and comprises a first arcuate portion with a center point located coincident with said central longitudinal axis and a second arcuate portion with a center point offset from said central longitudinal axis in a direction toward said first arcuate portion.

18. A machine table in combination with at least two setup devices for use in aligning stock relative to said machine table, said machine table comprising a planar surface having at least one longitudinal channel formed therein which extends parallel to said planar surface; and each of said at least two setup devices comprising:

an elongate member having opposed first and second ends and defining a central longitudinal rotational axis of the elongate member;

a stock engaging surface being located remote from said second end for engaging with and facilitating alignment of a desired piece of stock, and the stock engaging surface being concentric with the central longitudinal axis to facilitate spacing a desired piece of stock a desired distance away from the longitudinal axis regardless of the rotational orientation of the setup device;

a locking member being located adjacent said second end of each said setup device for engaging with said channel of said machine table and releasably securing each said setup device to said channel of said machine table; said locking member having a first transverse dimension and a second transverse dimension extending perpendicular to said first transverse dimension, said first transverse dimension being greater than said second transverse dimension, and said first transverse dimension being greater than the width of said channel of said machine table so that said first transverse dimension only allows partial rotation of said locking member within said channel of said machine table; and a mechanism for facilitating rotation of each said elongate member, when engaged with said channel of said machine table, to secure each said setup device at a desired location with respect to said channel, via said first transverse dimension engaging with said channel to prevent further rotation of said setup device relative to said channel, and thereby facilitate alignment of a desired piece of stock, relative to the machine table, via said stock engaging surface.

* * * * *